United States Patent
Hydrie et al.

(10) Patent No.: US 8,108,362 B2
(45) Date of Patent: Jan. 31, 2012

(54) SECURE CONTENT DESCRIPTIONS

(75) Inventors: Aamer Hydrie, Seattle, WA (US); John Miller, Cambridge (GB); Anders E. Klemets, Redmond, WA (US); Christos Gkantsidis, Cambridge (GB); Pablo Rodriguez Rodriguez, Barcelona (ES); Rebecca C. Weiss, Vienna, VA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 12/280,872

(22) PCT Filed: Feb. 8, 2007

(86) PCT No.: PCT/US2007/003527
§ 371 (c)(1),
(2), (4) Date: Aug. 27, 2008

(87) PCT Pub. No.: WO2007/100469
PCT Pub. Date: Sep. 7, 2007

(65) Prior Publication Data
US 2009/0138486 A1 May 28, 2009

(30) Foreign Application Priority Data
Feb. 28, 2006 (EP) .................................. 06270026

(51) Int. Cl.
*G06F 7/00* (2006.01)
*G06F 17/00* (2006.01)
(52) U.S. Cl. ........ 707/687; 707/703; 707/781; 707/708; 707/734
(58) Field of Classification Search .................. 707/708, 707/678
See application file for complete search history.

(56) References Cited

U.S. PATENT DOCUMENTS

| | | | |
|---|---|---|---|
| 6,026,430 A | 2/2000 | Butman et al. | |
| 6,128,740 A | 10/2000 | Curry et al. | |
| 6,658,568 B1 | 12/2003 | Ginter et al. | |
| 6,772,340 B1 | 8/2004 | Peinado et al. | |
| 6,772,341 B1 | 8/2004 | Shrader et al. | |
| 6,792,434 B2 * | 9/2004 | Moghaddam et al. | 1/1 |
| 6,801,909 B2 * | 10/2004 | Delgado et al. | 1/1 |
| 6,931,545 B1 | 8/2005 | Ta et al. | |
| 7,058,619 B2 | 6/2006 | Wanish | |
| 7,096,363 B2 * | 8/2006 | Kon et al. | 713/176 |
| 7,133,846 B1 | 11/2006 | Ginter et al. | |

(Continued)

FOREIGN PATENT DOCUMENTS
CN 1200853 A 12/1998
(Continued)

OTHER PUBLICATIONS

Schneier, "One-Way Hash Function", Dr. Dobb's Journal, Sep. 1991, pp. 148-151.

(Continued)

*Primary Examiner* — Don Wong
*Assistant Examiner* — Binh V Ho
(74) *Attorney, Agent, or Firm* — Lee & Hayes, PLLC

(57) ABSTRACT

The invention describes a control node for a content distribution network and a method of automatically verifying content distributed over a network at a node in the network. In the method, a content description is received which comprises a content identifier, a publisher identifier, publisher authorization information and content checking information. The integrity and validity of this information are checked and if both the checks are passed, the content description is stored.

15 Claims, 7 Drawing Sheets

U.S. PATENT DOCUMENTS

| | | | |
|---|---|---|---|
| 7,302,254 | B2 | 11/2007 | Valloppillil |
| 7,343,168 | B2 | 3/2008 | Valloppillil |
| 7,356,693 | B2 | 4/2008 | Kivinen et al. |
| 7,380,129 | B2 | 5/2008 | Keohane et al. |
| 7,434,262 | B2 | 10/2008 | Aaron et al. |
| 7,552,321 | B2 | 6/2009 | Rockwood et al. |
| 7,610,624 | B1* | 10/2009 | Brothers et al. ................ 726/24 |
| 7,730,527 | B2 | 6/2010 | Charles et al. |
| 7,843,855 | B2 | 11/2010 | O'Neal |
| 7,904,505 | B2 | 3/2011 | Rakers et al. |
| 2001/0005841 | A1 | 6/2001 | Wray |
| 2001/0018742 | A1 | 8/2001 | Hirai |
| 2002/0013772 | A1 | 1/2002 | Peinado |
| 2002/0104000 | A1 | 8/2002 | Kang et al. |
| 2002/0154162 | A1 | 10/2002 | Bhatia et al. |
| 2002/0169974 | A1 | 11/2002 | McKune |
| 2003/0028488 | A1 | 2/2003 | Mohammed et al. |
| 2003/0051051 | A1* | 3/2003 | O'Neal et al. ................ 709/242 |
| 2003/0055894 | A1 | 3/2003 | Yeager et al. |
| 2003/0056094 | A1 | 3/2003 | Huitema et al. |
| 2003/0084306 | A1 | 5/2003 | Abburi et al. |
| 2003/0115461 | A1 | 6/2003 | O'Neill |
| 2003/0120928 | A1 | 6/2003 | Cato et al. |
| 2003/0177111 | A1 | 9/2003 | Egendorf et al. |
| 2003/0187801 | A1 | 10/2003 | Chase, Jr. et al. |
| 2003/0194092 | A1 | 10/2003 | Parks et al. |
| 2003/0204742 | A1 | 10/2003 | Gupta et al. |
| 2003/0221195 | A1 | 11/2003 | Bizet |
| 2003/0236847 | A1 | 12/2003 | Benowitz et al. |
| 2003/0236976 | A1 | 12/2003 | Wheeler |
| 2004/0092250 | A1 | 5/2004 | Valloppillil |
| 2004/0093229 | A1 | 5/2004 | Plain |
| 2004/0098447 | A1 | 5/2004 | Verbeke et al. |
| 2004/0128504 | A1* | 7/2004 | Kivinen et al. ................ 713/158 |
| 2004/0196842 | A1 | 10/2004 | Dobbins |
| 2004/0236869 | A1 | 11/2004 | Moon |
| 2005/0071280 | A1 | 3/2005 | Irwin et al. |
| 2005/0071328 | A1* | 3/2005 | Lawrence ......................... 707/3 |
| 2005/0081037 | A1* | 4/2005 | Kumagai et al. ............. 713/175 |
| 2005/0114650 | A1* | 5/2005 | Rockwood et al. ........... 713/155 |
| 2005/0157742 | A1* | 7/2005 | Chen et al. .................... 370/432 |
| 2005/0198061 | A1 | 9/2005 | Robinson et al. |
| 2005/0203851 | A1 | 9/2005 | King et al. |
| 2005/0210508 | A1 | 9/2005 | Lau et al. |
| 2005/0259648 | A1* | 11/2005 | Kodialam et al. ............. 370/389 |
| 2005/0262552 | A1 | 11/2005 | Brown et al. |
| 2006/0020560 | A1 | 1/2006 | Rodriguez et al. |
| 2006/0024653 | A1 | 2/2006 | Battagin et al. |
| 2006/0059548 | A1 | 3/2006 | Hildre et al. |
| 2006/0085633 | A1 | 4/2006 | Balfanz et al. |
| 2006/0112092 | A1* | 5/2006 | Ziou et al. ......................... 707/5 |
| 2006/0173811 | A1 | 8/2006 | Gustin et al. |
| 2006/0174051 | A1 | 8/2006 | Lordi et al. |
| 2006/0174160 | A1* | 8/2006 | Kim ................................ 714/18 |
| 2007/0053513 | A1 | 3/2007 | Hoffberg |
| 2007/0074019 | A1 | 3/2007 | Seidel |
| 2007/0097975 | A1* | 5/2007 | Rakers et al. ................. 370/392 |
| 2008/0059631 | A1 | 3/2008 | Bergstrom et al. |

FOREIGN PATENT DOCUMENTS

| | | |
|---|---|---|
| CN | 1401172 A | 3/2003 |
| CN | 101390070 A | 3/2009 |
| EP | 1107137 A2 | 6/2001 |
| EP | 1282289 A2 | 2/2003 |
| EP | 1626551 A1 | 2/2006 |
| EP | 1801720 A1 | 6/2007 |
| EP | 1826695 A1 | 8/2007 |
| JP | 2004-295845 | 10/2004 |
| KR | 1020080113356 | 12/2008 |
| WO | WO03090125 | 10/2003 |
| WO | WO2004107124 A2 | 12/2004 |
| WO | WO2007100469 A1 | 9/2007 |

OTHER PUBLICATIONS

Wikipedia, "BitTorrent", retirved at <http://en.wikipedia.org/w/index.php?title=BitTorrent&oldid=32277833> on Jun. 29, 2006, pp. 2-3 and pp. 8.

Bakker et al., "A Law-Abiding Peer-to-Peer Network for Free-Software Distribution", IEEE, Retrived on Apr. 13, 2009, pp. 60-67.

"BitTorrent", Retrieved on Aug. 8, 2006 at http://en.wikipedia.org/w/index.php?title=BitTorrent&oldid=32277833>, Wikipedia, Dec. 2005, pp. 14.

Popescu et al., "A Certificate Revocation Scheme for a Large-Scale Highly Replicated Distributed System", Proceedings of the Eighth IEEE International Symposium on Computers and Communication, 2003, IEEE, pp. 1-7.

BitTorrent; Wikipedia online, Dec. 21, 2005; retrieved from <<http://en.wikipedia.org/w/index.php?title=BitTorrent&oldid=32277833>> on Jun. 29, 2006, pp. 2, 3, and 8.

First Chinese Office Action response for CN 200780006816.3 dated Mar. 15, 2010, 13 pages.

First Office Action for CN 200780006816.3 dated Nov. 13, 2009, 14 pages.

Notice on Grant of Patent Right for Invention dated Jun. 11, 2010 for CN 200780006816.3, 4 pages.

EP Office Action dated Sep. 7, 2009 from EP 06270026.5, 5 pages.

EP Search Report dated Jul. 17, 2006 from EP05270097.8, 5 pages.

EP Search Report dtd Aug. 8, 2006 from EP06270026.5, 6 pages.

International Prelim Report dated Sep. 12, 2008 for PCT/US2007/003527, 10 pages.

International Search Report and Written Opinion dated Aug. 7, 2007 for PCT/US2007/003527, 9 pages.

Non-Final Office Action for U.S. Appl. No. 12/097,926, mailed on May 26, 2011, Christos Gkantsidis, "Authorisation and Authentication".

* cited by examiner

SECURE CONTENT DESCRIPTIONS

RELATED APPLICATIONS

This application is a National Stage of International Application No. PCT/US2007/003527, filed 8 Feb. 2007, which claims priority from European Patent Application No. 06270026.5, filed on 28 Feb. 2006. Both applications are incorporated herein by reference.

BACKGROUND

Content distribution systems have been developed to enable data such as software updates and critical patches to be distributed to nodes in a network. Typically these systems comprised many servers which were placed in the network, with nodes connecting directly to one of the servers to download the required file. However, such systems are constrained by the connection bandwidth to the servers and require considerable investment to increase the capacity of the system. Consequently, content distribution systems have been developed which rely on a fully distributed architecture with nodes in the network participating in the distribution process. Such systems may be referred to as peer-to-peer or peer-assisted content distribution systems. In such a system, the server may divide the file to be distributed into a number of blocks and provide these blocks to nodes in the network. As soon as a node has received one or more blocks, the node can act as a source of the received blocks for other nodes whilst concurrently receiving further blocks until they have received all the blocks of the file.

Malicious users can cause problems for such systems in many ways. These include distribution of false content (i.e. content which is not what it purports to be). This false content may include viruses or other harmful programs or may just waste network resources sharing data which is unwanted. Malicious users may distribute corrupted downloaded data which may then be distributed by other peers who are unaware that it is corrupted. This may result in such large scale dissemination of corrupted data that the distribution of a particular piece of data is impossible. Where the content distribution network uses network coding, introduction of a single corrupt block from a piece of content can very rapidly result in the corruption of all the blocks of that piece of content which are being distributed.

In other examples, malicious users may instigate denial of service attacks against particular elements in the network, for example, by making repeated connection attempts which may subsequently be aborted but which consume resources. Depending on where the denial of service attack is directed against, such an attack may cause the entire distribution system to fail or may just affect one or more individual users.

The invention seeks to provide an improved method and apparatus for content distribution and content validation, which mitigate problems of known methods and apparatus.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a method of automatically verifying content distributed over a network at a node in the network, the method comprising: receiving a content description for a piece of content published by a publisher node, the content description comprising a content identifier, a publisher identifier, publisher authorisation information and content checking information; checking the integrity of the content description; checking the validity of the content description; and if both the integrity and validity checks are passed, storing the content description.

Advantageously, this allows a recipient of the content to have confidence that the content being published is legitimate and is that which they expect. If the content is found to be invalid, illegal, or otherwise objectionable, the content description can be revoked by the publisher and if the publisher is found to be publishing invalid, illegal, offensive or other objectionable content, the publisher's authorisation can be revoked by the authorisation body, therefore preventing the publisher from publishing further content. The content description therefore enables a recipient to check the status of both the publisher and the content.

Preferably the content description is a self-certifying data structure.

Preferably checking the integrity of the content description comprises: checking a cryptographic signature associated with the content description.

Advantageously, using cryptographically signed content descriptions, it is computationally unfeasible for a malicious user to tamper with the content description and for the resultant content description to pass the integrity test.

Preferably checking the validity of the content description comprises: accessing a certificate revocation list issued by the publisher; confirming that the content description is not included on the certificate revocation list; and confirming that the publisher authorisation information is valid.

Advantageously, this enables the publisher to control the distribution of the content they publish. If the publisher wants to halt publication before the expiry of the content description, the publisher can add the details of the content description to their certificate revocation list.

Preferably the content description further comprises a start time and an expiry time, and wherein checking the validity of the content description further comprises: checking that the current time is after the start time and before the expiry time of the content description.

Advantageously, this enables a publisher to set a period over which the content description is valid and content distribution can occur.

Preferably the publisher authorisation information comprises an identifier for an authorising body, and confirming that the publisher authorisation information is valid comprises: accessing a certificate revocation list issued by the authorisation body; confirming that the publisher identifier is not included on the certificate revocation list.

The identifier may comprise a name of an authorising body or a pointer to a CRL location for the authorising body.

Preferably the method further comprises: receiving a request from a peer; and providing the peer with the content description.

Preferably the method further comprises: periodically rechecking the validity of the content description; and if the content description is invalid, deleting the content description.

Preferably the node comprises a control node or a peer.

A second example provides a computer program comprising computer program code means adapted to perform all the steps of any of the methods described above when said program is run on a computer.

Preferably the computer program is embodied on a computer readable medium.

A third example provides a node in a content distribution system comprising: means for receiving a content description for a piece of content published by a publisher node, the content description comprising a content identifier, a publisher identifier, publisher authorisation information and content checking information; means for checking the integrity of the content description; means for checking the validity of the content description; and a store for storing the content description, wherein the store is arranged to store the content description only if both the integrity and validity checks are passed.

Preferably the content description is a self certifying data structure.

Preferably the means for checking the validity comprises: means for accessing a certificate revocation list issued by the publisher; means for confirming that the content description is not included on the certificate revocation list; and means for confirming that the publisher authorisation information is valid.

Preferably the content description further comprises a start time and an expiry time, wherein the node further comprises a clock and wherein the means for checking the validity further comprises: means for checking that the current time on the clock is after the start time and before the expiry time of the content description.

Preferably the publisher authorisation information comprises an identifier for an authorising body, and wherein the means for confirming that the publisher authorisation information is adapted to: access a certificate revocation list issued by the authorisation body; and confirm that the publisher identifier is not included on the certificate revocation list.

Preferably the node is a control node or a peer.

A fourth example provides a content distribution system comprising at least one control node and/or peer as described above.

A fifth example provides a data structure comprising: a content identifier, a publisher identifier, publisher authorisation information and content checking information.

Preferably the data structure is self certifying. The data structure may comprise a X.509 certificate.

The data structure may be a secure content description.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilised. The description sets forth the functions of the example and the sequence of steps for constructing and operating the example. However, the same or equivalent functions and sequences may be accomplished by different examples.

Although the present examples are described and illustrated herein as being implemented in a peer-assisted distribution system (also known as a peer-to-peer distribution system), the system described is provided as an example and not a limitation. Where examples are described with reference to a particular peer-assisted distribution system (e.g. the system developed by Microsoft (trade mark) and known as Avalanche or Mercury), this is by way of example only and the techniques described may be implemented in any other content distribution system. As those skilled in the art will appreciate, the present examples are suitable for application in a variety of different types of content distribution and/or content sharing systems, including server based content distribution systems.

Figure 1:
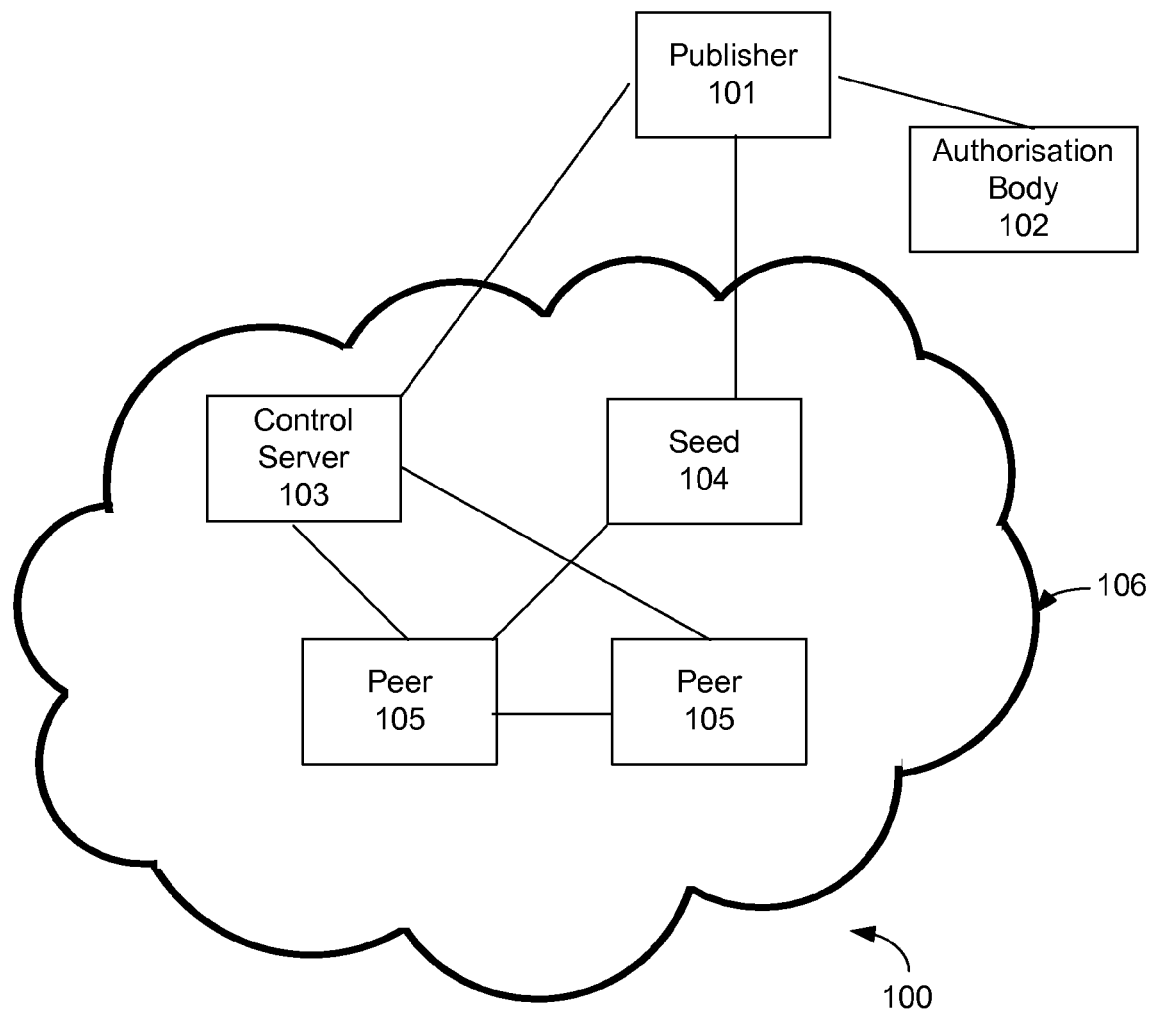
FIG. 1 is a schematic diagram of a content distribution system.

FIG. 1 is a schematic diagram of a content distribution system 100 which comprises a publisher 101, an authorisation body 102, a control server 103, a seed 104 and two peers 105. Content distribution occurs within the cloud 106. The content may be any type of data and may be distributed, for example, as encoded blocks. The publisher 101 is the entity which provides the content and which is authorised by an authorisation body 102. The publisher may be a user or corporation and may lie within or outside the content distribution cloud 106. The control server 103 (also known as a registrar or a tracker) helps peers 105 find other peers that are participating in the distribution of a particular piece of content. The seed 104 is a client which is usually always on and is where the publisher places a piece of content for subsequent distribution within the system. A seed 104 uploads the content to a small number of peers 105 in the system 100 (this may be to as few as a single peer) but does not download the same content from other nodes in the system. The term 'node' is used herein to refer to any logical entity within the system. A peer 105 is a client which is interested in obtaining the content held by the seed 104. A peer will download the content from nodes (e.g. peers or seeds) in the system and may also upload those parts of the content that it has received to other peers in the system. A peer may act as a temporary or virtual seed once it has received all of the particular pieces of content, by making the content available for uploading to other peers in the system, whilst no longer downloading the content from peers. The content may be distributed within the cloud in an encoded format, or alternatively, the content may be not be encoded.

As will be appreciated by the skilled person, the content distribution system 100 shown in FIG. 1 is by way of example only and a content distribution system may comprise a sub-set of the elements shown in FIG. 1 and/or may contain additional elements. Furthermore, the elements shown in FIG. 1 are functional elements and more than one functional element may be combined within a physical network node. FIG. 1 shows some logical connections between parts of the system 100, however those shown are not exhaustive and are for illustration purposes only.

Figure 2:
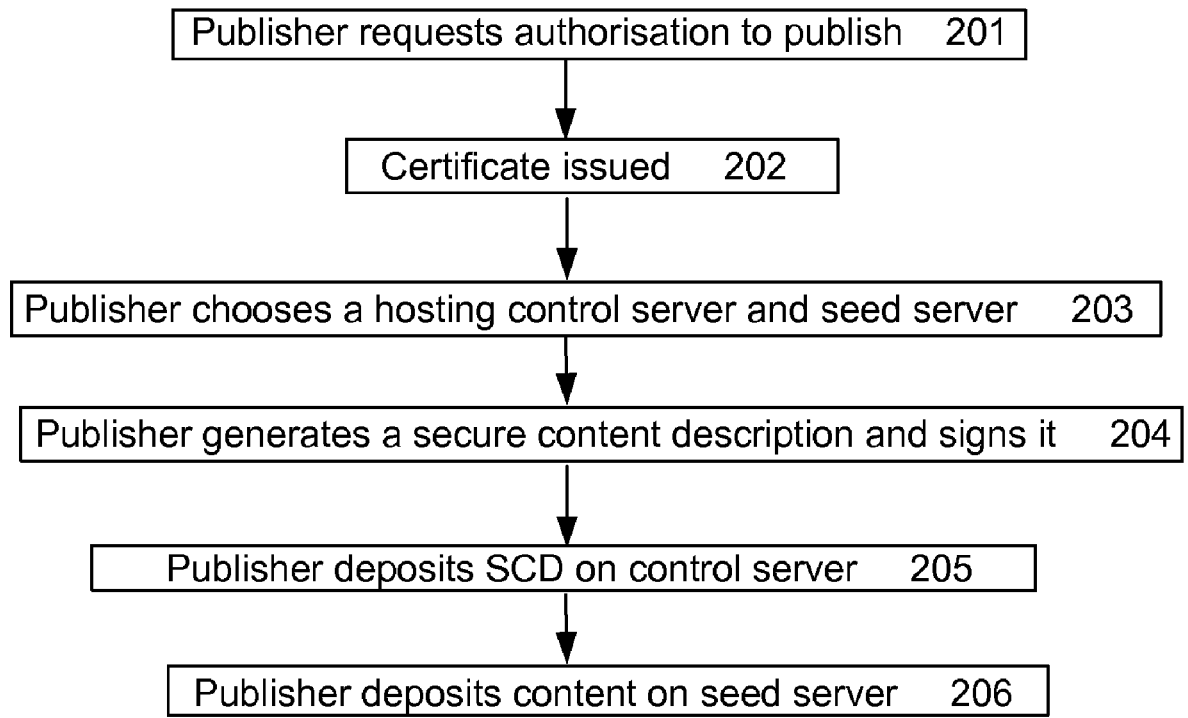
FIG. 2 is a flow chart showing an example of the operation of a publisher node.

FIG. 2 is a flow chart showing an example of the operation of the publisher 101. The publisher 101 requests authorisation to publish from the authorisation body 102 (step 201). In response to this, the authorisation body issues a certificate (step 202). This certificate may be specific to a piece of content or the certificate may not relate to any particular piece of content and may be used by the publisher when publishing any piece of content in any content distribution cloud. The publisher 101 then chooses a hosting control server 103 and a seed server 104 (step 203) and generates a secure content description (SCD) which it digitally signs (step 204). The SCD includes details of the certificate issued to the publisher (in step 202 above) and information to enable integrity checking of the downloaded content. The content distribution cloud 106 is then established by the publisher depositing the signed SCD on the control server 103 (step 205) and the content on the seed server 104 (step 206). The SCD and each of the method steps will be described in more detail below.

The request for authorisation to publish (step 201) may be made by applying for authority from a certification authority (CA) such as Microsoft's (trade mark) certification authority. In some cases, the CA with the root credentials (e.g. Microsoft (trade mark)) may authorise a publisher to sub-authorise publishers and they may in turn also be able to authorise sub-publishers. For example, the CA may authorise a publisher (for example, a fictitious publisher called 'Publisher 1') and may allow them to sub-authorise parts of the organisation (e.g. 'Publisher 1—news' and 'Publisher 1—comedy') as publishers. This process of sub-authorisation may also be referred to as delegation.

The certificate issued (in step 202) in response to the request (in step 201) is a self-certifying data structure and may take the form of an X.509 certificate. The term 'self-certifying' is used herein to refer to the fact that the structure contains its own proof that it has not been tampered with, for example it may have a cryptographic signature which ensures that the certificate has not been tampered with. X.509 is an ITU-T (the International Telecommunication Union's Telecommunication Sector) standard for public key infrastructure (PKI). The certificate may be provided to the publisher 101 or may be stored in a central repository (not shown in FIG. 1) and details provided to the publisher 101. Any other suitable authorisation method could be used instead of X.509 certificates including other certificate schemes, shared secrets and derived tokens.

The selection of a hosting control server (step 203) may involve the publisher setting up their own control server or obtaining permission to use a third party control server. The control server 103 may also be authorised by the CA so that the publisher can be confident that the control server is legitimate and a peer can be confident of the integrity of the information obtained from a control server. Where the control server is authorised, authentication may occur between the publisher 101 and the control server 103 as part of the selection process (step 203), prior to the generation of the SCD (step 204) or prior to the depositing of the SCD on the control server (step 205). The authentication process may involve the publisher checking the certificate chain of the control server in a similar manner to that described below.

The seed 104 which is selected (also in step 203) may offer the content to peers within the cloud using any suitable protocol, including, but not limited to, any Avalanche-supported protocol and http (hyper text transfer protocol). Avalanche (also referred to as Mercury) is a peer-assisted content distribution protocol developed by Microsoft Corporation (trade mark) which uses network coding. This means that each node in the system generates and transmits encoded blocks of information, these newly encoded blocks being a linear combination of all the blocks currently held by the particular node. One of the benefits of such a protocol is that it minimises the probability that a particular part (or block) of the content is or becomes rare in the network. The seed 104 may also be authorised by the CA so that the publisher can be confident that the seed is legitimate and will only distribute content in a legitimate manner. Where the seed is authorised, authentication may occur between the publisher 101 and the seed 104 as part of the selection process (step 203), prior to the generation of the SCD (step 204) or prior to the depositing of the content on the seed (step 205). The authentication process may involve the publisher checking the certificate chain of the seed in a similar manner to that described below.

The secure content description (SCD) generated by the publisher (in step 204) is a self-certifying structure providing details of the content publisher and their authorisation and enabling validation of transmitted and reassembled content. The SCD does not need to be encrypted, but some or all of it could be encrypted in some examples.

The SCD may include some or all of the following:

A serial number of the SCD.

Details of the algorithm used to sign the SCD.

A time from which the SCD is valid (e.g. in UTC, coordinated universal time).

An expiry time for the SCD.

Publisher identification information, which may include a globally unique ID for the publisher and a publisher identifier, such as the publisher's name, the certificate thumbprint or Common Name (CN) of a content publisher or the publisher's encoded X.509 certificate.

Information on the publisher's public key, which may be a self-signed certificate.

Certificate Revocation List (CRL) location information.

The file name of the content.

The length of the content file.

A unique identifier for the content. This is typically the value of the content hash.

A creation time for the content.

A hash algorithm and hash value for the decoded content.

Transfer settings required to specify homomorphic hashes, such as number of blocks and encoding algorithm.

Homomorphic hash algorithm specifications and values.
One or more seed endpoint descriptions.
One or more control server endpoint descriptions.

The SCD may be encoded into an X.509 certificate using X.509 extension fields. This allows existing X.509 certificate management and validation infrastructure to be used to work with the SCD. In one example, the different elements within the SCD may be mapped to X.509 certificate fields and an example implementation is shown in the table below. Fields marked with an asterisk are standard X.509 fields and the remaining fields are X.509 extension fields.

| Field Name | Field Type | Description |
| --- | --- | --- |
| *dwVersion | DWORD | CERT_V3 - describes the X.509 certificate version |
| *SerialNumber | CRYPT_INTEGER_BLOB | Certificate serial number for tracking, revocation |
| *SignatureAlgorithm | CRYPT_ALGORITHM_IDENTIFIER | Identifies what algorithm was used to sign the certificate |
| *Issuer | CERT_NAME_BLOB | Fully qualified name of the SCD publisher |
| *NotBefore | FILETIME | First second (in UTC) the SCD can be considered valid |
| *NotAfter | FILETIME | Last second (in UTC) the SCD can be considered valid |
| *Subject | CERT_NAME_BLOB | CN = content filename |
| *SubjectPublicKeyInfo | CERT_PUBLIC_KEY_INFO | Publisher's key. This is a self-signed cert |
| *IssuerUniqueId | CRYPT_BIT_BLOB | Globally unique publisher ID |
| *SubjectUniqueId | CRYPT_BIT_BLOB | Globally unique content ID for the SCD |
| CRL | CRL_DIST_POINTS_INFO | List of locations a CRL can be obtained from to see whether this SCD has been revoked |
| PublisherMetadata | CRYPT_BIT_BLOB | Optional publisher metadata, in whatever form the publisher chooses |
| ContentMetadata | CRYPT_BIT_BLOB | Optional content metadata, in whatever form the publisher chooses |
| ContentCreationTime | FILETIME | UTC Time the content creation timestamp should be set to |
| FileLength | UINT64 | 64-bit length of the content, in bytes |
| ContentHashType | CRYPT_ALGORITHM_IDENTIFIER | Type of hash used to validate content integrity |
| ContentHashData | CRYPT_HASH_BLOB | Hash value for the content |

In another example, the elements within the SCD may be mapped to a single X.509 extension field containing a data structure, where the data structure contains all the individual pieces of information. The first example is more transparent, whilst the second example results in a shorter processing time.

Metadata may also be included within the SCD, for example, metadata describing the publisher and/or metadata describing the content properties, including suggested file name, file length, media type, rating, originator (which can be distinct from the publisher), DRM (digital rights management) information (e.g. where to obtain a license), and content information such as the actors, director etc. This may provide useful information about the content which may be searchable via an application (either automatically or under the control of a user) which reads the SCD.

The SCD is signed by the publisher (in step 204) for example using the publisher's private key which can be validated by a public key traced to the root CA via a valid certificate chain. An example of a certificate chain is as follows:

Microsoft holds root certificate
  'Publisher 1' issued certificate by Microsoft on Sep. 9, 2005, expires Sep. 9, 2006, can delegate (i.e. can sub-authorise)
    'Publisher 1—news' issued certificate by 'Publisher 1' on Oct. 9, 2005, expires Sep. 9, 2006, cannot delegate The digital signature may comprise the digitally signed hash of the SCD (i.e. the hash of the SCD which has been encrypted using the publisher's private key). This allows the recipient of the SCD to confirm that the SCD has not been tampered with by comparing the received hash value with a calculated hash value.

Having generated and signed the SCD, the publisher deposits it on the control server (step 205), deposits the content on the seed server (step 206) and thereby establishes the content distribution cloud 106. The publisher may also store the SCD serial number in case it is necessary to revoke, update or reissue the SCD or in case they wish to stop publication of the SCD. After this stage, the publisher 101 may choose to play no further part in the content distribution process.

If the publisher subsequently determines that the content was incorrectly described or wishes to halt distribution of the content before the expiry of the SCD, the publisher can revoke the SCD. In order to revoke the SCD, the publisher places the serial number of the particular SCD onto its certificate revocation list (CRL). As described below, the CRL will be regularly checked by entities within the content distribution cloud and once it has been identified that the SCD is included on the CRL no further distribution will occur, so that the period of time between placing the serial number of the SCD onto the CRL and the ceasing of distribution is minimised. Once the serial number of a particular SCD has been placed on the publisher's CRL, it will remain there until it is removed by the publisher or the entry is deleted upon expiry of the SCD (according to the expiry time detailed within the SCD). An SCD can be directly revoked by the publisher that created the SCD. The authorisation body that authorised the publisher (that created the SCD) can indirectly revoke the SCD by revoking the publisher's authorisation. Where there is a certificate chain (as described above) this indirect revocation can occur at any point in the chain. In the certificate chain example given above, if 'Publisher 1—news' created the SCD, they can revoke it directly, whilst 'Publisher 1' can revoke it indirectly by revoking the certificate given to 'Publisher 1—news' and Microsoft can revoke it indirectly by the revoking the certificate given to 'Publisher 1'.

In another example, the publisher may wish to stop the publication of the SCD. Stopping publication of an SCD has a different effect to revocation, in that the SCD is not invalid, it is just not published anymore. This has the effect that no new peers can join the content distribution cloud 106, however peers already participating in the cloud (and who therefore already have the SCD) are able to continue to distribute blocks of content. The control server will, however, not provide any further assistance to peers to find other peers in the cloud. Publication will therefore stop but this will not occur as quickly as with revocation. Stopping publication may be achieved by sending an 'unpublish' message to the control server along with the serial number of the SCD and credentials proving that the sender of the message is allowed to make such an 'unpublish' decision (e.g. a copy of the publisher's certificate). It may be necessary to check these credentials before the control server acts upon the unpublish message. The 'unpublish' message may be in the form of a self-certifying data structure. In one example, the unpublish message would contain an SCD identical to the published SCD except with an unpublish flag inside it.

Having established the content distribution cloud, as described above with reference to FIG. 2, the publisher may wish to update the SCD, for example to provide revised metadata, or to change the expiry date, whilst the content is being distributed within the cloud 106. In order to update the SCD, the publisher generates a new SCD (with a new serial number) and signs it (as in step 204) and deposits the new SCD on the control server (as in step 205). The old SCD may be revoked (as described above), however, this will result in peers who have downloaded part of the file losing that part. Instead, if the change is advisory (e.g. a metadata change) then the old SCD may not be revoked but instead the new SCD will be given to peers requesting the SCD and the old SCD will not be given any more peers.

Figure 3:
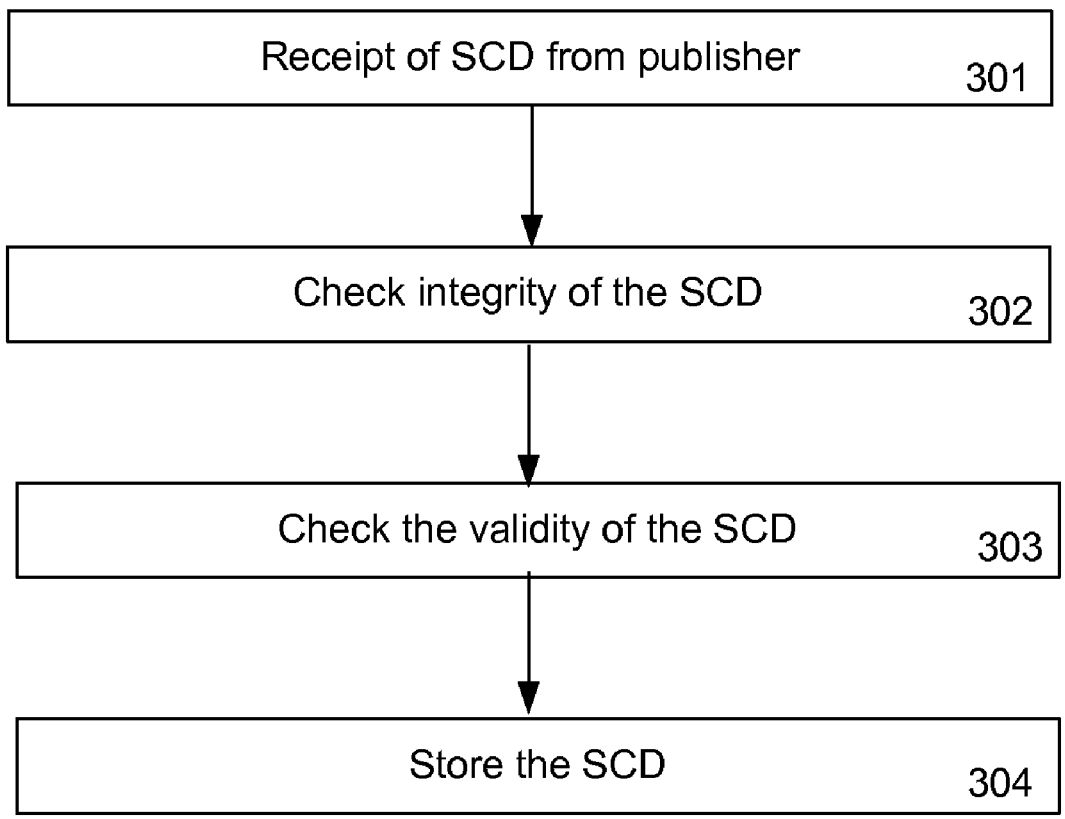
FIG. 3 is a flow chart showing an example of the operation of a control node.
Figure 4:
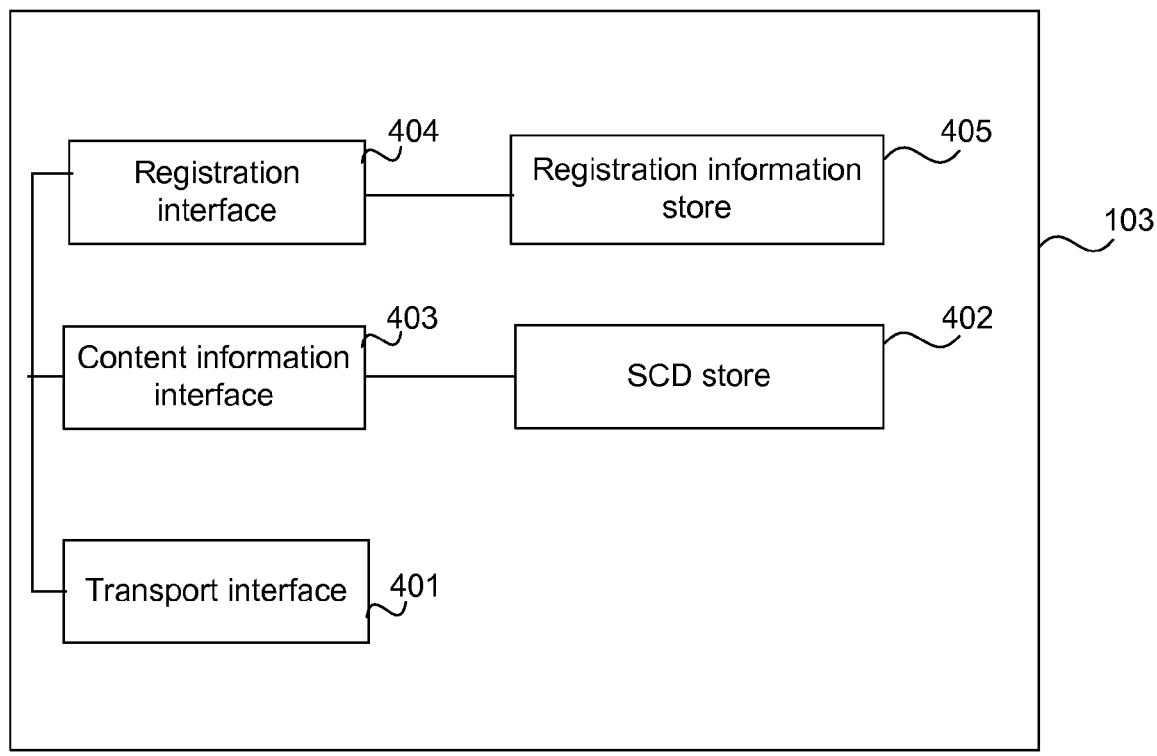
FIG. 4 is a schematic diagram of an example architecture for a control node.

The operation of the control server 103 can be described with reference to FIG. 3 which is a flow chart showing an example of an operation of the control server 103 and FIG. 4 which shows an example architecture for the control server. The control server 103 comprises a transport interface 401 which is used to receive and send messages via a message transport (not shown), a content information interface 403 which is responsible for storing and retrieving SCDs from the SCD store 402, and a registration interface 404 which is responsible for storing and retrieving peer registration information from the registration information store 405. The control server 103 receives the SCD from the publisher 101 (FIG. 2 step 205 and FIG. 3 step 301) via the transport interface 401 and then checks the integrity of the SCD (step 302) to ensure that it has not been tampered with since it was generated. This may be achieved by calculating the hash value of the SCD and checking that the calculated value is equal to the hash value contained within the digital signature of the SCD. If the SCD passes the integrity test, the control server checks the validity of the SCD (step 303) and this step is described in more detail below with reference to FIG. 5. The integrity and validity checks may be performed by the SCD store 402. The SCD store may, in addition to validating standard fields in the SCD, also validate metadata within the SCD. If the SCD passes both the integrity test (step 302) and the validity test (step 303), it is then stored in the SCD store 402. The operation of the registration interface 404 and the registration information store 405 are described below with reference to FIG. 6.

Figure 5:
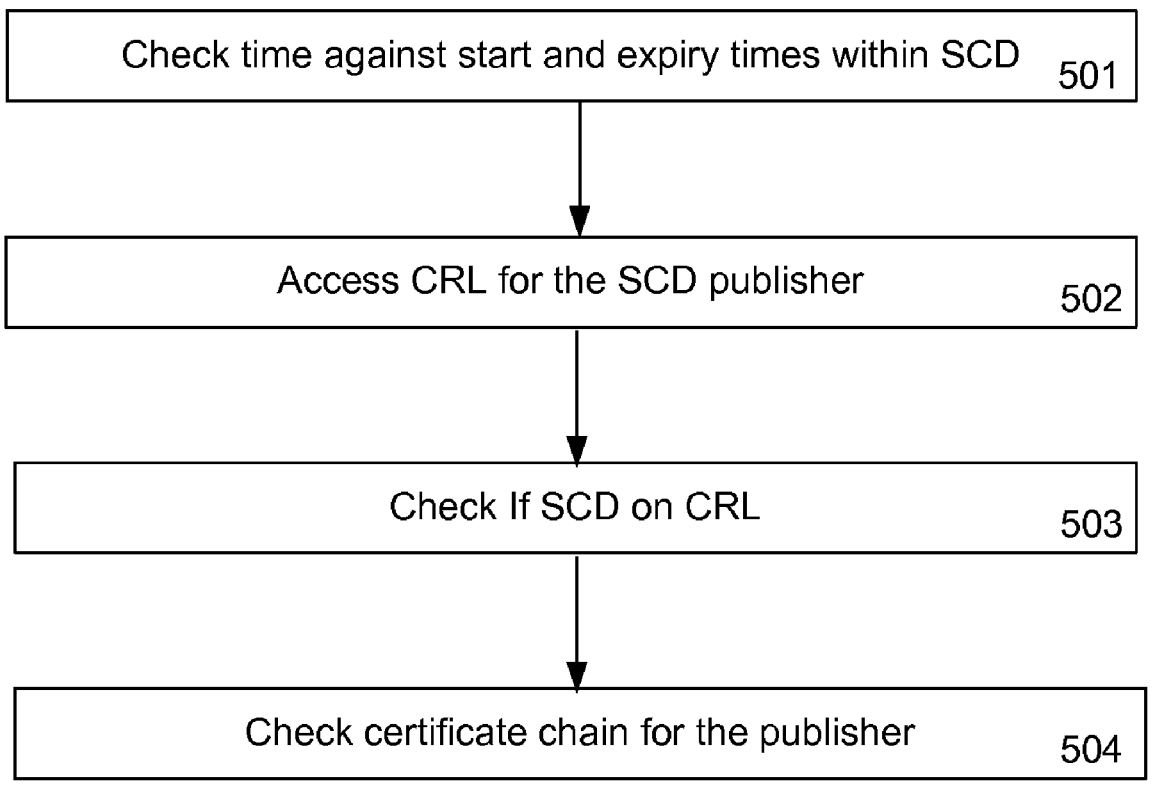
FIG. 5 shows an example flow diagram for the validity check.

FIG. 5 shows an example flow diagram for the validity check which is performed on the SCD (step 303). The current time (e.g. in UTC) is checked against the 'NotBefore' and 'NotAfter' times within the SCD (step 501). If the current time is outside this window of time, then the SCD is invalid. The Certificate Revocation List (CRL) for the publisher is then accessed (step 502) in order to check whether the SCD has been revoked by the publisher 101 (step 503). The CRL lists certificates (if the publisher is permitted to sub-authorise) and SCDs issued by the publisher that have been subsequently revoked. Alternatively, the publisher may hold two CRLs, one for SCDs and one for certificates that it has revoked. The use of CRLs enables a publisher to update an SCD by issuing a new SCD and revoking the earlier SCD or to stop publication of content (e.g. if it is found to be corrupt or for any other reason). A publisher's CRL may be stored at the publisher 101 or may be stored elsewhere in the network e.g. at a central CRL repository. The location of the publisher's CRL may be included in the SCD (e.g. in the field 'CRL' as shown in the table above).

Having checked that the SCD is not included in the publisher's CRL (step 503), the control server may check the certificate chain for the publisher to confirm that the publisher is still authorised by the CA (step 504). This may be achieved by the control server confirming that the publisher is not on the Certificate Revocation List (CRL) published by the entity that issued the certificate to the publisher, for example the authorisation body 102. The control server 103 may hold copies of CRLs locally, but ideally checks with CAs or their delegates for updated CRLs regularly (e.g. every 15 or 30 minutes) to minimise the window of vulnerability. The certificate chain may include details of where the master CRL is located for each authorising entity (e.g. a url, IP address or other endpoint description). As anyone who can issue a certificate can also revoke certificates that they issued, it may be necessary to check more than on CRL (for example, in the example certificate chain given above, CRLs published by both Microsoft and 'Publisher 1' would need to be checked). Each CRL includes (either in the list or in associated information) details of when the CRL was last updated and how regularly the CRL should be rechecked (e.g. "Updated 10 Oct. 2005 at 16.09. Re-check every 2 hours"). Although the CRL may specify a proposed (or maximum) time between re-checking, it may be beneficial for the control server to re-check more often. Mechanisms may be used such that the control server's local copy of the CRL expires after a certain interval and cannot then be used.

The CRLs are created in such a manner that they cannot be edited by anyone other than the issuing entity (i.e. the CA or their delegate). For example, only Microsoft (trade mark) can amend their CRL which lists certificates Microsoft (trade mark) originally issued but have subsequently revoked and only 'Publisher 1' can amend their CRL which lists certificates that 'Publisher 1' initially issued, as a delegate for Microsoft, but that 'Publisher 1' have subsequently revoked. If the control server, when checking a CRL, identifies that the SCD has been revoked (in step 503) or that the publisher of a piece of content has had their authorisation revoked (in step 504), the SCD will not be stored (in step 304) but will be discarded or rejected. If as described above, the control server is authorised to perform the function, authentication may occur between the publisher and the control server (e.g. before or as part of step 301).

Figure 6:
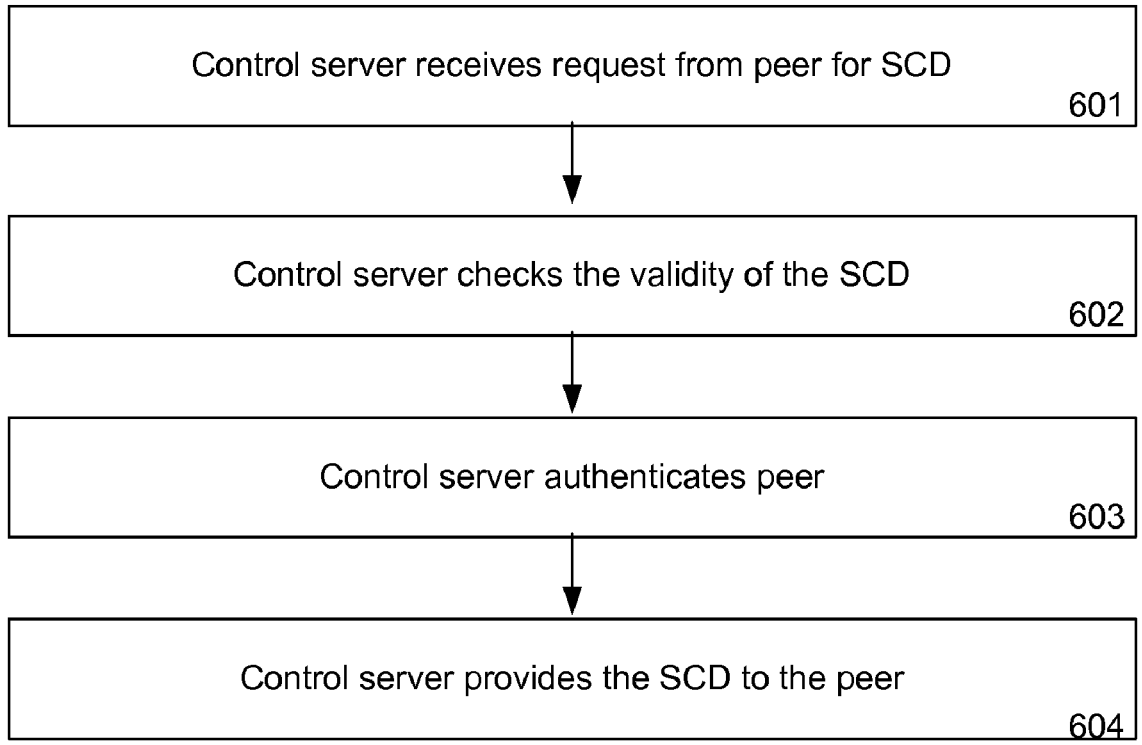
FIG. 6 is a flow chart showing a second example of the operation of a control node.

Further aspects of the operation of the control server 103 can be described with reference to FIG. 6 which is a second flow chart showing an example of an operation of the control server 103. Having stored an SCD (as described above), the control server may subsequently receive a request for the SCD for a particular piece of content from a peer 105 (step 601). Prior to responding to this request the control server may re-check the validity of the SCD (step 602). This check may be performed as shown in FIG. 5 and described above and may in addition (or alternatively) be performed when a peer re-registers or periodically (whether requests are received from peers or not). As the appropriate CRLs have been accessed previously (in step 303), these may already be stored locally at the control server and these local copies or the master copies of the CRL may be accessed. If the SCD is found to be invalid, the control server may check for an updated SCD relating to the same content which is also stored at the control server. If no valid SCD for the content is available, the request from the peer (received in step 601) will be rejected. If the validity check was instead initiated by a peer re-registering, the peer will not be re-registered and may be informed that the SCD is now invalid. If a valid SCD for the content is available, the control server may perform authentication with the peer (step 603) using the registration interface 404 and registration information store 405. This may be one-way authentication (peer authenticates control server) or two-way (mutual) authentication. However, in another the example the SCD may be considered public information and the authentication may occur at a later stage prior to exchange of more private information (e.g. information on peer endpoints as described below). The control server then provides the SCD (and potentially other information) to the peer (step 604).

In another aspect of the operation of the control server, as described above, the control server may receive a request from the publisher 101 to stop publication of the SCD (an 'unpublish' message). In response to the receipt of this message, the control server may check that the sender of the message is permitted to cause the publication of the content to cease (e.g. by checking that the certificate in the message belongs to the publisher of the content). If the message is found to be valid, then the relevant SCD will be deleted from the SCD store 402 and will not be provided to any further peers. Additionally any peers subsequently requesting the SCD will have their request rejected, the list of active peers for the SCD will be purged and any peers that try and re-register with the control server or request additional peer endpoint information will have their requests rejected.

Figure 7:
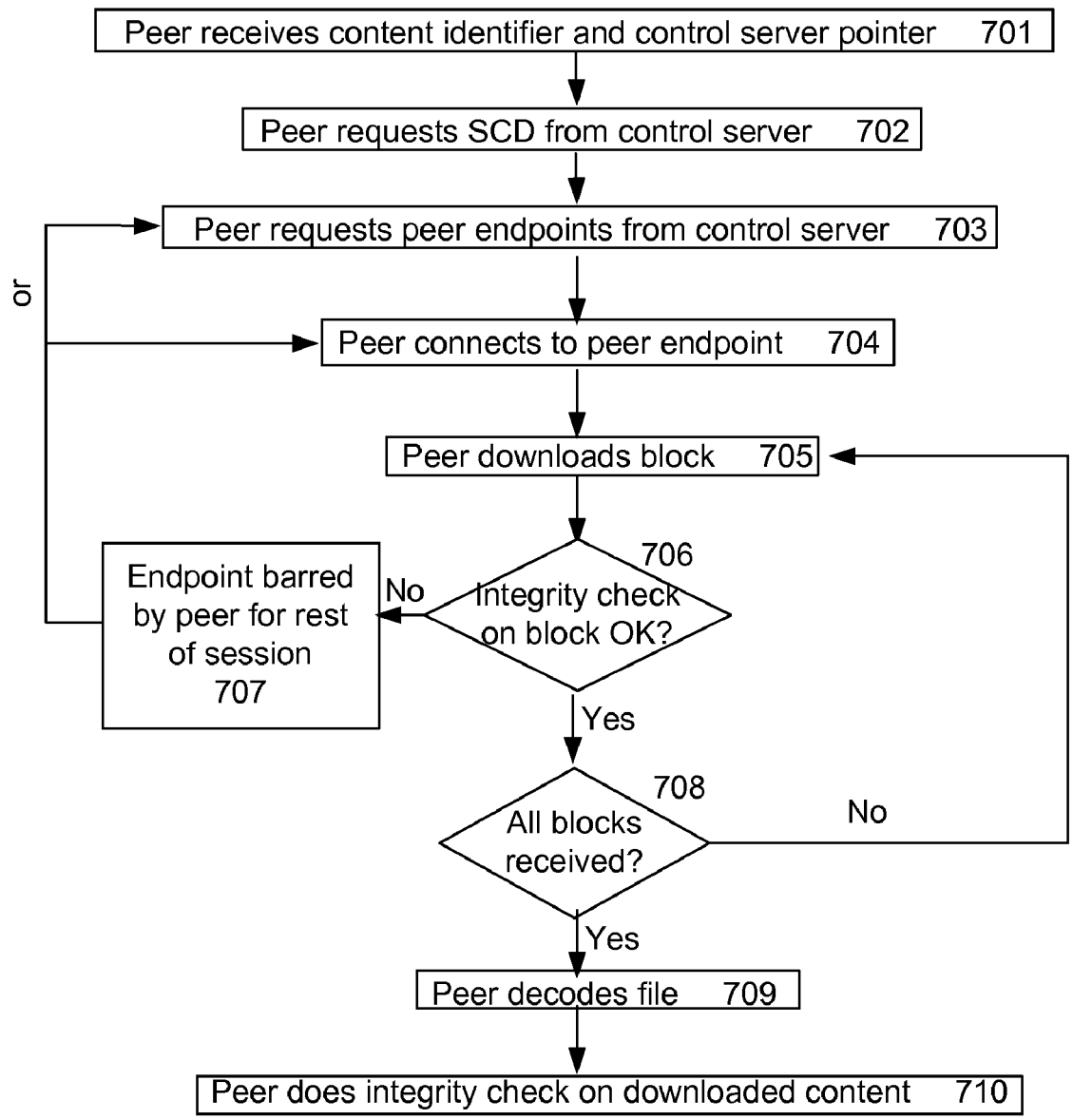
FIG. 7 is a flow chart showing an example of the operation of a peer.

The operation of a peer 105 can be described with reference to FIG. 7. A peer 105 receives a content identifier and a control server pointer (step 701). This information may be received from a website, URI (Uniform Resource Identifier) or as part of an application experience (e.g. as part of an Interactive Media Player, iMP). Using this information, the peer 105 can request a SCD from the identified control server 103 (step 702) and then request details of peer endpoints from a control server (step 703). These peer endpoints are details of one or more other peers which the peer can connect to in order to download the content. The peer endpoints may also include details of the seed 104, particularly in the early stages of a cloud 106 when there are not many peers within the cloud. The peer 105 then connects to one or more of the identified peer endpoints (step 704) and downloads a block of the content (step 705).

Before adding the block to the peer's store of received blocks or forwarding it to anyone else, the integrity of the block is verified (step 706). If the integrity of the block is found to be suspect, the peer makes a note of the offending peer endpoint and may not contact it or accept connections from it for the remainder of the content distribution session (step 707). Instead, the peer will connect to another peer endpoint (step 704) and if necessary will first request further details of peer endpoints from the control server (step 703). In making the request, the peer may indicate to the control server the identity of the blocked peer and also the identity of any peers that the peer is currently connected to. This enables the control server to provide the peer with new useful peer endpoint information and also to log offending peers within the cloud 106. In an example, repeat offenders may be blocked from participating in the cloud, for example by de-registering them or by refusing to provide further peer endpoint information. If the integrity of the block is verified (in step 706), the peer determines whether it has received all the required blocks of the content (step 708). If it still requires additional blocks, it will proceed to download another block (step 705). Once the peer has downloaded all the required blocks of the content, the peer decodes the file (step 709) and does an integrity check on the downloaded content (step 710). Further detail on the individual steps is provided below.

The content identifier and control server pointer (received in step 701) may be in the form of a URI such as:
avalanche://mytracker.microsoft.com/
0123456789ABCDEF0123456789ABCDEF
In another example both the content identifier and control server pointer may be provided in a single 128 bit identifier. In another example, the information may be provided in a small file (e.g. via a web download) with a locally registered type which, when downloaded and activated, invokes the content distribution client e.g. Avalanche. The content identifier and control server pointer may include details of the certificate issued to the publisher.

The control server pointer may be a pointer to an IP (internet protocol) address, a DNS (Domain Name System) entry or use any other method of specifying a network endpoint. Use of a DNS entry may be advantageous because it provides flexibility and scalability of routing. For example the DNS server can direct the peer to an IP address of a control server which is not hardwired into the control server pointer and may change. This is beneficial where there may be several control servers and the DNS server can direct peers to different servers in sequence to share the load. Furthermore, use of a DNS entry allows for additional control servers to be added or for control servers to be taken offline for maintenance, if required, without the need to change the control server pointer.

The content identifier and control server pointer may be actively retrieved (in step 701) by the peer and this may be initiated by a user input at the peer or by an application running on the peer. In an example, the peer may receive the content identifier and control server pointer in response to obtaining authorisation to participate in the cloud 106, for example, by purchasing the right to particular content (e.g. the right to download a film may be purchased from an online store). Such authorisation may be in the form of a certificate, a shared secret, a derived token or any other suitable authorisation method. In another example, the content identifier and control server pointer may be pushed to the peer, for example to an application such as a media player running on the peer. The push may be in response to a previous indication of interest from the peer, e.g. a peer may indicate the types of news items, audio clips or video clips which are of interest and then when content which fits the criteria becomes available, the content identifier and control server pointer may be pushed to the peer.

When the peer 105 requests the SCD from the control server (in step 702), the peer and the control server may be required to authenticate (either one way or two way authentication) to prove that each is authorised to perform these roles of peer and control server (as described above in relation to FIG. 6, step 603). However, in another the example the mutual authentication may occur at a later stage (in step 703) prior to exchange of more sensitive information. This mutual authentication helps prevent denial of service or spoofing attacks on the system. Where the control server is authorised, the peer may check the certificate chain of the control server. On receipt of the SCD, the peer may perform one or more checks, such as checking the integrity of the SCD (e.g. in the same way as described above with reference to FIG. 3, step 302) and/or the validity of the SCD (e.g. as shown in FIG. 5 and described above). In another example, the peer may not check the integrity and validity of the SCD but may check the authorisation status of the publisher (as described above in reference to step 504). As described above, a copy of the CRL may be stored at the control server along with details of how up to date the CRL copy is. Consequently, in order to check whether the SCD is on the publisher's CRL (step 403) and/or to check the Publisher's certificate chain (step 404), the peer may retrieve a copy of the CRL stored at the control server or alternatively may retrieve a copy of the CRL master issued by the authorising body which issued the list. By connecting to the control server 103 to retrieve the CRL, rather than the certificate issuing body (or central CRL store), the peer may avoid a potential bottleneck in the system. If a peer, when checking a CRL, identifies that the publisher of a piece of content has had their authorisation revoked or that the SCD has been revoked, the peer may end its participation in the cloud and not download further blocks. The peer may also delete any blocks of the content that they have already received.

The peer may be required to re-register with the control server to confirm that they are still active within the content distribution cloud 106. At this point, the control server may inform the peer if the SCD for the content is invalid. If the peer is required to re-register frequently (e.g. every 5 minutes), then there will only be a short window between the control server identifying that an SCD is invalid and the peers ceasing further distribution of the content. The interval for re-registering may be set by the control server and may vary according to the size of the content distribution cloud (e.g. for a small cloud, the time may be reduced to 45 seconds). The re-registration message sent by the peer to the control server may contain information to enable the control server to determine how useful a peer is to other peers within the cloud. Such information may include how much content the peer holds, which blocks of content the peer holds and the data rate of the connection to the peer. If a peer fails to re-register within the period set by the control server, they will time-out and will no longer be part of the distribution cloud. Consequently, when a peer wishes to leave a cloud (e.g. when they have downloaded all the blocks of a piece of content), they may either fail to re-register or may send an explicit de-register message to the control server.

In addition to (or instead of) checking the status of the SCD and the publisher's authorisation when the SCD is received, the peer may re-check one or both of these prior to sending blocks to other peers participating in the content distribution cloud 106 and/or when the peer re-registers with the control server to confirm that they remain an active peer within the cloud. However, as the CRL is likely to be a large file (e.g. several Mbytes), the peer may limit the number of times that it downloads updated CRLs from the control server or other source.

The control server from which the peer requests the SCD (in step 702) may be the same or different to the control server from which the peer requests information on peer endpoints (in step 703). Where the two control servers are different, the information on the second control server, from which the peer requests information on peer endpoints (in step 703), may be identified in the SCD provided by the first control server, (see description of the SCD above). In another example, the SCD may contain a further control server pointer (rather than endpoint information). This is a more flexible approach and the pointer may be to a location where control server details are stored along with certificates for the control servers so that the peer can confirm that the control server is a valid control server for the publisher of the piece of content in question.

Before the peer can obtain information on peer endpoints for the content cloud from the control server (in step 703), the peer authenticates the control server or alternatively, mutual authentication may occur between the control server and the peer. This authentication may occur earlier in the process (e.g. in step 702) or may occur at this stage. The authentication process confirms to the peer that the control server is an authorised control server by sharing details of the control server's authorisation by a CA. Again the peer may choose to consult the relevant CRL. This prevents rogue control servers from being established within the cloud. If mutual authentication occurs, the control server is also able to identify the peer (e.g. using a unique host identifier), although it may not be necessary for the peer to have a specific authorisation to participate in a cloud. The use of a unique peer identification mechanism enables the control server to determine if a peer is making multiple requests for peer endpoint information, which may indicate that the peer has a malicious intent. The control server may for this reason, or any other, decide to block a peer from a content cloud. The peer identification may be allocated to a peer for use in all situations (e.g. all clouds that they join) or may be allocated on a more regular basis (e.g. per cloud, per publisher, per network provider, per month etc).

The control server may provide a peer with peer endpoint information (in step 703) for randomly selected peers, for peers selected according to a locality algorithm or peers selected according to any other criteria (e.g. connection speed of the peer). The control server may limit the number of peers that it provides information on to any one peer and may also limit the regularity with which a peer (e.g. referenced to a host identifier) can request peer endpoint information (e.g. a limit of information on 10 peers every 15 minutes). This is to mitigate information disclosure, because the peer endpoint information is potentially sensitive and would be useful to a malicious user or to an advertiser. The peer endpoint information may comprise:

One or more network endpoint descriptions, such as an IP endpoint or a URL (uniform resource locator).

A content cloud identifier describing the content cloud the endpoint is participating in.

A host identifier (preferably unique to that host).

Where peers are randomly selected, the control server may include the seed 104 as a peer with a probability of 1/k, where k is the number of active peers in the cloud including the new peer.

When a peer (e.g. peer A) connects to one or more of the other peers (e.g. peer B) that the control server has identified as being part of the content cloud 106, the peer (peer A) may perform authentication with the other peers (peer B). Although there is not necessarily an equivalent of a CRL for peers, the peers may identify each other by their host identifier or by an authorisation issued to allow the peer to participate in the cloud. The authentication between peers is beneficial so that a peer (peer A) can identify a peer (peer B) that provides it with an invalid block of data and can then block further communication with that peer for the remainder of the session (see steps 706 and 707). The authentication may also assist in preventing denial of service attacks mounted on a peer by a malicious peer by making multiple aborted or slow connections between the peer and the malicious peer. Through the authentication process, a peer may identify that the same peer is making multiple connection requests and then block some or all of those connections. The authentication between peers may also include providing information on where the peer that initiates the connection (peer A) obtained details of the other peer (peer B) from, e.g. the details of the control server providing the peer endpoint information. This may permit a peer to check the authorisation of that control server prior to initiating transfer of blocks between the peers.

A peer may connect to one or more other peers (in step 704) within the cloud 106 in order to obtain parts of the content. A limit may be set on the number of peers that a peer may connect to at any one time (e.g. 1 peer may connect to no more than 14 other peers). This limit may effectively be set by the limit on the number of peer endpoint details provided to the peer by the control server (in step 703) or the limit may be set independently by the control server, the publisher or the peer.

Whilst peers may authenticate each other, as above, the transmissions between them (e.g. in step 705) are not necessarily encrypted. Peers may, if required, negotiate a session key for privacy and apply a stream cipher.

Although the above description refers to transfer of blocks between peers, it will be appreciated that blocks may also be transferred from a seed to a peer. In this situation the peer may authenticate with the seed, and may check the certificate chain of the seed to confirm that they are authorised to act as a seed for the publisher and/or the piece of content in question.

Having received a block (in step 705), a peer may check the integrity of that block for example using a hash function, such as a homomorphic hash function. Details of the hash function(s) used for the individual blocks of content and the content as a whole may be provided to the peer in the SCD, as described above. In another example, the homomorphic hashes may be transmitted independently from the SCD. Hash functions map a large block of information, b, to an output h(b) typically of much smaller size. The hash function has the property that given a block b, it is computationally infeasible to find another block, b', with the same hash value, i.e. where h(b)=h(b'). This means that by checking that the calculated hash function of a received block of data matches the expected hash function, the peer can be relatively confident that the block received is the correct block and that the block has not been tampered with. Homomorphic hash functions have the additional property that the hash value of a linear combination of some input blocks can be constructed efficiently by a combination of the hashes of the input blocks. Consequentially, use of homomorphic hash functions is particularly suited to content distribution protocols that use network coding, such as Avalanche.

In another example, secure random checksums (SRCs) may be used instead of homomorphic hashes. The peer is provided with a number of SRC series, where each SRC series comprises a SRC for each uncoded block which makes up the content and a numerical seed which was used to generate the SRC values. Like homomorphic hashes, the SRC value of an encoded block can be calculated from the SRC values of the uncoded blocks, by combining them in a manner related to the way the uncoded blocks were combined to form the coded block. A simplified example of this calculation is shown below for a single SRC series where all the calculations are performed within a finite field:

The received block comprises $\alpha A+\beta B$, where A and B are original uncoded blocks and $\alpha$ and $\beta$ are random coefficients.

The received block comprises bytes B1, B2 . . . , Bn

SRC list includes $SRC\text{-}A_1$ and $SRC\text{-}B_1$

The seed is used to calculate pseudo-random numbers $R1_1, R2_1 \ldots, Rn_1$ $SRC\text{-}new_1 = (B1 \cdot R1_1) + (B2 \cdot R2_1) + \ldots + (Bn \cdot Rn_1)$ Check that $SRC\text{-}new_1 = \alpha(SRC\text{-}A_1) + \beta(SRC\text{-}B_1)$ This calculation is then repeated for each SRC series that has been provided to the peer by the control server. The control server may use a selection method to ensure that different peers are provided with substantially different groups of SRC series as this reduces the possibility that a malicious peer can create corrupt content blocks which still pass all the SRC tests.

Once a peer has downloaded a block (in step 705) or alternatively, after the integrity of the block has been checked (in step 706), the control server adds that peer to a list of active peers in the cloud and then may subsequently provide details of that peer to other peers in subsequent requests for peer endpoint information received from other peers that wish to participate in the cloud. In order for the peer to be added to the list of active peers in a cloud, the peer may be required to register with the control server to identify that they have received some content. The peer may also be required to re-register periodically to confirm that they remain an active participant in the cloud. In other examples, the peer may be added to the list before it has downloaded a block, for example, when it has requested the SCD (in step 702).

Having received all the required blocks for the content (step 708), the peer decodes the content, or otherwise reconstructs it where the content was not encoded (step 709). Before using the content (or alternatively before making it available to third parties), the peer does a final integrity check on the whole content (in step 710). The final integrity check may involve checking that the calculated hash matches the expected hash (as described above with reference to step 706). Details of the expected hash, or parameters to enable it to be calculated, may be provided in the SCD.

The above description describes the use of hash functions, homomorphic hash functions and secure random checksums by way of example only. Other techniques may alternatively be employed by the peer to enable them to determine with a high degree of confidence both that the individual parts of the content (e.g. the individual blocks) and the whole content received are valid and have not been tampered with (i.e. in steps 706 and 710).

The above description refers to CRLs. These may be in the form of self-certifying data structures. Furthermore, in addition to or instead of listing SCD serial numbers, the CRLs may list content identification numbers or content names.

FIG. 1 shows a single cloud 106. A peer may however, be connected to more than one logically distinct cloud and many of the peers and control servers may be common between clouds. Each logically distinct cloud has one publisher and a publisher may be responsible for several clouds. A peer in one cloud may be acting as a seed in another cloud, or even acting as a control server. The terms 'seed', 'peer' and 'control server' are used to define the role being played by the node in the cloud in question and the terms do not necessarily imply specific hardware requirements. For example, the seed, peer and control server may each comprise a personal computer. Within the same cloud, a physical node may be performing more than one logical role, e.g. seed and control server.

In the above examples, peers may be able to join any cloud or they may require specific authorisation to join a cloud, e.g. by purchasing the right to a particular download. The publisher 101 or other entity may set criteria for participation in a cloud. For example, only subscribers to a particular network or service may be eligible to participate in a cloud. In another example, the cloud may have minimum bandwidth requirements such that only peers who have connections that exceed a certain bandwidth (e.g. 512 MBit/s) may be allowed to participate in a cloud. In a further example, certain quotas may be associated with a cloud, for example detailing the total number of peers that can participate in a cloud or the maximum number (or proportion) of peers with a slow connection that can join a cloud.

The content described above may be any kind of data including, but not limited to, software, data files, audio media and video media.

By using methods and apparatus as described above to publish content for distribution in a content distribution system, a recipient of the content can have confidence that the content being published is legitimate and is that which they expect. If the content is found to be invalid, illegal or otherwise objectionable the SCD can be revoked by the publisher and if the publisher is found to be publishing invalid, illegal, offensive or other objectionable content, the publisher's authorisation can be revoked by the authorisation body, therefore preventing the publisher from publishing further content. As described above, the SCD therefore enables a recipient to check the status of both the publisher and the content. By using cryptographically signed SCDs, it is computationally unfeasible for a malicious user to tamper with the SCD and for the resultant SCD to pass the integrity test. However, the methods and apparatus described do not necessarily prevent misuse of non-public content by a rogue peer once it has been downloaded. Consequently, additional protection may be provided in the form of license activation codes for software and DRM (Digital Rights Management) for audio and video media.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

What is claimed is:

1. A method of automatically verifying content distributed over a network at a node in the network, the method comprising:
   receiving, at the node comprising a processor, a content description for a piece of content published by a publisher node, the content description comprising a content identifier, a publisher identifier, publisher authorisation information and content checking information, wherein the publisher authorisation information comprises an identifier for an authorising body;
   checking, at the node comprising the processor, the integrity of the content description;
   checking, at the node comprising the processor, the validity of the content description, wherein checking the validity of the content description comprises:
   accessing a certificate revocation list issued by the publisher;
   confirming that the content description is not included on the certificate revocation list; and
   confirming that the publisher authorisation information is valid, wherein confirming that the publisher authorisation information is valid comprises:
   accessing a certificate revocation list issued by the authorising body;
   confirming that the publisher identifier is not included on the certificate revocation list; and
   when both the integrity and validity checks are passed, storing the content description at the node comprising the processor.

2. A method according to claim 1, wherein the content description is a self certifying data structure.

3. A method according to claim 1, wherein checking the integrity of the content description comprises:
   checking a cryptographic signature associated with the content description.

4. A method according to claim 1, wherein the content description further comprises a start time and an expiry time, and wherein checking the validity of the content description further comprises:
   checking that the current time is after the start time and before the expiry time of the content description.

5. A method according to claim 1 further comprising:
   receiving a request from a peer; and
   providing the peer with the content description.

6. A method according to claim 1 further comprising:
   periodically re-checking the validity of the content description; and
   if the content description is invalid, deleting the content description.

7. A method according to claim 1 wherein the node comprises a control node or a peer.

8. A storage device having computer program code recorded thereon, the computer program code, upon execution, programming a computer to perform the steps of claim 1 when said program is run on the computer.

9. A storage device as recited in claim 8 embodied on a computer.

10. A node in a content distribution system comprising:
a processor;
means for receiving a content description for a piece of content published by a publisher node, the content description comprising a content identifier, a publisher identifier, publisher authorisation information and content checking information, wherein the publisher authorisation information comprises an identifier for an authorising body;
means for checking the integrity of the content description;
means for checking the validity of the content description, wherein the means for checking the validity comprises:
means for accessing a certificate revocation list issued by the publisher;
means for confirming that the content description is not included on the certificate revocation list, wherein the means for confirming that the publisher authorisation information is adapted to:
access a certificate revocation list issued by the authorisation body; and confirm that the publisher identifier is not included on the certificate revocation list; and
means for confirming that the publisher authorisation information is valid; and
a store for storing the content description, wherein the store is arranged to store the content description only if both the integrity and validity checks are passed.

11. A node according to claim 10, wherein the content description is a self certifying data structure.

12. A node according to claim 10, wherein the content description further comprises a start time and an expiry time, wherein the node further comprises a clock and wherein the means for checking the validity further comprises:
means for checking that the current time on the clock is after the start time and before the expiry time of the content description.

13. A control node for a content distribution system comprising a node according to claim 10.

14. A peer node for a content distribution system comprising a node according to claim 10.

15. A seed node for a content distribution system comprising a node according to claim 10.

* * * * *

UNITED STATES PATENT AND TRADEMARK OFFICE
CERTIFICATE OF CORRECTION

| | | |
|---|---|---|
| PATENT NO. | : 8,108,362 B2 | Page 1 of 1 |
| APPLICATION NO. | : 12/280872 | |
| DATED | : January 31, 2012 | |
| INVENTOR(S) | : Aamer Hydrie et al. | |

It is certified that error appears in the above-identified patent and that said Letters Patent is hereby corrected as shown below:

In column 17, line 1, delete "may" and insert -- may, --, therefor.

Signed and Sealed this
Twenty-seventh Day of March, 2012

David J. Kappos
*Director of the United States Patent and Trademark Office*